(12) United States Patent
Tang (10) Patent No.: US 9,696,579 B2
(45) Date of Patent: Jul. 4, 2017

(54) LIQUID CRYSTAL PANEL AND LIQUID CRYSTAL DISPLAYING DEVICE

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 258 days.

(21) Appl. No.: 14/431,740

(22) PCT Filed: Jan. 21, 2015

(86) PCT No.: PCT/CN2015/071213
§ 371 (c)(1),
(2) Date: Mar. 26, 2015

(87) PCT Pub. No.: WO2016/106901
PCT Pub. Date: Jul. 7, 2016

(65) Prior Publication Data
US 2016/0342020 A1 Nov. 24, 2016

(30) Foreign Application Priority Data
Dec. 31, 2014 (CN) .......................... 2014 1 0854152

(51) Int. Cl.
*G02F 1/1335* (2006.01)
*G02F 1/1333* (2006.01)
*G02F 1/1343* (2006.01)

(52) U.S. Cl.
CPC .. *G02F 1/133528* (2013.01); *G02F 1/133308* (2013.01); *G02F 1/134363* (2013.01);
(Continued)

(58) Field of Classification Search
CPC .................. G02F 1/133528; G02F 1/133308
See application file for complete search history.

(56) References Cited

U.S. PATENT DOCUMENTS

2006/0001798 A1* 1/2006 Jang .................. G02F 1/133528
349/96
2006/0061710 A1* 3/2006 Lin .................... G02F 1/133528
349/99
(Continued)

FOREIGN PATENT DOCUMENTS

| CN | 102331636 | * | 1/2012 | |
| JP | WO/2013/111867 | * | 8/2013 | ......... G02F 1/13363 |

*Primary Examiner* — Sang V Nguyen
(74) *Attorney, Agent, or Firm* — Andrew C. Cheng (57) ABSTRACT

A liquid crystal panel includes, sequentially stacked, a glass cover plate, a first polarizer, a liquid crystal layer, a second polarizer, and a glass bottom plate. The liquid crystal layer includes a plurality of pixels. Each of the pixels includes a plurality of liquid crystal molecules. The first polarizer includes first absorption axes and second absorption axes. The second polarizer includes third absorption axes and fourth absorption axes. The first absorption axes of the first polarizer and the third absorption axes of the second polarizer have axial directions that are orthogonal to each other and form a first orthogonal system. The second absorption axes of the second polarizer and the fourth absorption axes of the second polarizer have axial directions that are orthogonal to each other and form a second orthogonal system. The first orthogonal system and the second orthogonal system define therebetween an included angle of 45 degrees.

16 Claims, 6 Drawing Sheets

(52) U.S. Cl.
CPC ............ *G02F 2001/133331* (2013.01); *G02F 2001/133357* (2013.01); *G02F 2001/133531* (2013.01); *G02F 2001/133538* (2013.01); *G02F 2001/133548* (2013.01)

(56) References Cited

U.S. PATENT DOCUMENTS

| | | | | |
|---|---|---|---|---|
| 2012/0105783 A1* | 5/2012 | Pau | ........................ | C09K 19/38 349/127 |
| 2012/0194763 A1* | 8/2012 | Cheong | ............. | G02F 1/133555 349/62 |
| 2014/0126053 A1* | 5/2014 | Won | ................. | G02F 1/133533 359/487.02 |
| 2014/0354910 A1* | 12/2014 | Park | ................. | G02F 1/133536 349/42 |
| 2015/0301249 A1* | 10/2015 | Pau | ..................... | G02B 5/3016 349/124 |

\* cited by examiner

LIQUID CRYSTAL PANEL AND LIQUID CRYSTAL DISPLAYING DEVICE

CROSS REFERENCE TO RELATED APPLICATIONS

This application claims the priority of Chinese Patent Application No. 201410854152.8, entitled "Liquid Crystal Panel", filed on Dec. 31, 2014, the disclosure of which is incorporated herein by reference in its entirety.

BACKGROUND OF THE INVENTION

1. Field of the Invention

The present invention relates to the field of liquid crystal technology, and in particular to a liquid crystal panel and a liquid crystal displaying device.

2. The Related Arts

Due to advantages of thin outside configuration, low voltage and low power consumption, being free of radiation, high brightness, and high contrast, the consumer market of liquid crystal panels have been rapid and growing, bringing an increasing demand. More and more consumers demand products that involve liquid crystal panels, such as display screens of mobile phones and personal digital assistants or even large-sized computer display screens and televisions for the purposes of providing perfect displaying performances. An important measure of enhancing the displaying performance is to increase the view angle of the liquid crystal panel.

SUMMARY OF THE INVENTION

The present invention provides a liquid crystal panel having better contrast and a wider view angle.

A liquid crystal panel comprises, sequentially stacked, a glass cover plate, a first polarizer, a liquid crystal layer, a second polarizer, and a glass bottom plate. The liquid crystal layer comprises a plurality of pixels. Each of the pixels comprises a plurality of liquid crystal molecules. The first polarizer comprises first absorption axes and second absorption axes. The second polarizer comprises third absorption axes and fourth absorption axes. The first absorption axes of the first polarizer and the third absorption axes of the second polarizer have axial directions that are orthogonal to each other and form a first orthogonal system. The second absorption axes of the second polarizer and the fourth absorption axes of the second polarizer have axial directions that are orthogonal to each other and form a second orthogonal system. The first orthogonal system and the second orthogonal system define therebetween an included angle of 45 degrees.

Further, the first polarizer comprises a plurality of first absorption axis series and second absorption axis series that are arranged alternately. Each of the first absorption axis series comprises a plurality of the first absorption axes that is arranged to form a row. Each of the second absorption axis series comprises a plurality of the second absorption axes that is arranged to form a row.

Further, the first polarizer comprises, sequentially stacked, a first substrate, a first sub polarization layer, a first middle planarization layer, a second sub polarization layer, and a first surface planarization layer. The first absorption axis series is formed on the first sub polarization layer. The second absorption axis series is formed the second sub polarization layer. The second absorption axis series and the first absorption axis series are sequentially and alternately arranged on a plane on which the first polarizer is located.

Further, the second polarizer comprises a plurality of third absorption axis series and fourth absorption axis series that are arranged alternately. Each of the third absorption axis series comprises a plurality of the third absorption axes that is arranged to form a row. Each of the fourth absorption axis series comprises a plurality of the fourth absorption axes that is arranged to form a row.

Further, the second polarizer comprises, sequentially stacked, a second substrate, a third sub polarization layer, a second middle planarization layer, a fourth sub polarization layer, and a second surface planarization layer. The third absorption axis series is formed on the third sub polarization layer. The fourth absorption axis series is formed on the fourth sub polarization layer. The fourth absorption axis series and the third absorption axis series are sequentially and alternately arranged on a plane on which the second polarizer is located.

Further, the first polarizer and the second polarizer are organic polarizers.

Further, the first polarizer and the second polarizer are polyvinylalcohol film optic polarization plates or dichroic organic dye polarization plates.

Further, the first polarizer and the second polarizer are metal wire grating polarizers.

Further, the first orthogonal system and the second orthogonal system are arranged to correspond to different pixel rows of the liquid crystal panel.

A liquid crystal displaying device comprises a liquid crystal panel. The liquid crystal panel comprises, sequentially stacked, a glass cover plate, a first polarizer, a liquid crystal layer, a second polarizer, and a glass bottom plate. The liquid crystal layer comprises a plurality of pixels. Each of the pixels comprises a plurality of liquid crystal molecules. The first polarizer comprises first absorption axes and second absorption axes. The second polarizer comprises third absorption axes and fourth absorption axes. The first absorption axes of the first polarizer and the third absorption axes of the second polarizer have axial directions that are orthogonal to each other and form a first orthogonal system. The second absorption axes of the second polarizer and the fourth absorption axes of the second polarizer have axial directions that are orthogonal to each other and form a second orthogonal system. The first orthogonal system and the second orthogonal system define therebetween an included angle of 45 degrees.

Further, the first polarizer comprises a plurality of first absorption axis series and second absorption axis series that are arranged alternately. Each of the first absorption axis series comprises a plurality of the first absorption axes that is arranged to form a row. Each of the second absorption axis series comprises a plurality of the second absorption axes that is arranged to form a row.

Further, the first polarizer comprises, sequentially stacked, a first substrate, a first sub polarization layer, a first middle planarization layer, a second sub polarization layer, and a first surface planarization layer. The first absorption axis series is formed on the first sub polarization layer. The second absorption axis series is formed the second sub polarization layer. The second absorption axis series and the first absorption axis series are sequentially and alternately arranged on a plane on which the first polarizer is located.

Further, the second polarizer comprises a plurality of third absorption axis series and fourth absorption axis series that are arranged alternately. Each of the third absorption axis series comprises a plurality of the third absorption axes that is arranged to form a row. Each of the fourth absorption axis series comprises a plurality of the fourth absorption axes that is arranged to form a row.

Further, the second polarizer comprises, sequentially stacked, a second substrate, a third sub polarization layer, a second middle planarization layer, a fourth sub polarization layer, and a second surface planarization layer. The third absorption axis series is formed on the third sub polarization layer. The fourth absorption axis series is formed on the fourth sub polarization layer. The fourth absorption axis series and the third absorption axis series are sequentially and alternately arranged on a plane on which the second polarizer is located.

The present invention provides a liquid crystal panel and a liquid crystal displaying device, which comprise a first polarizer having first absorption axes and second absorption axes and a second polarizer having third absorption axes and fourth absorption axes that are arranged to form a first orthogonal system and a second orthogonal system. With the first orthogonal system and the second orthogonal system, the contrast ratio and view angle range of the liquid crystal panel are enhanced so as to improve visual feeling of the liquid crystal panel.

BRIEF DESCRIPTION OF THE DRAWINGS

To more clearly explain the technical solutions proposed in embodiments of the present invention or those of the prior art, a brief description of the drawings that are necessary for describing the embodiments of the present invention is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
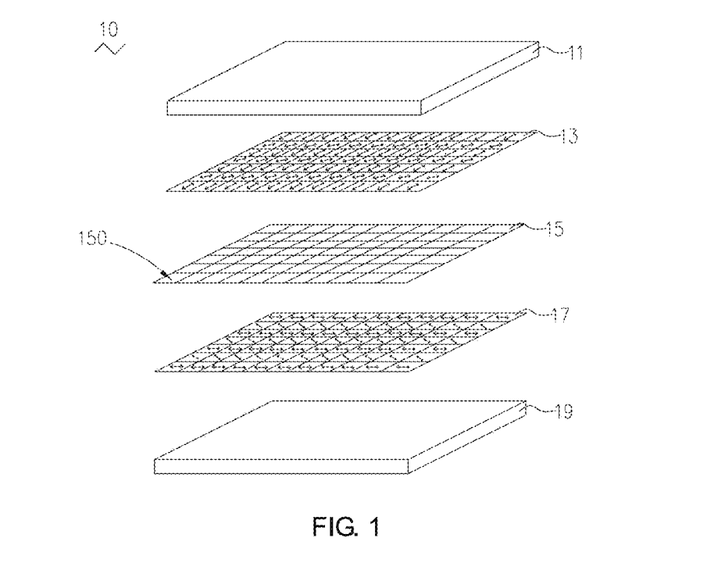
FIG. 1 is a schematic view showing a liquid crystal panel according to a preferred embodiment of the present invention.

A preferred embodiment of the present invention provides a liquid crystal panel 10, which comprises, sequentially stacked, a glass cover plate 11, a first polarizer 13, a liquid crystal layer 15, a second polarizer 17, and a glass bottom plate 19. The liquid crystal layer 15 is arranged between the first polarizer 13 and the second polarizer 17. The liquid crystal layer 15 comprises a plurality of pixels 150 and each of the pixels 150 comprises a plurality of liquid crystal molecules.

Figure 2:
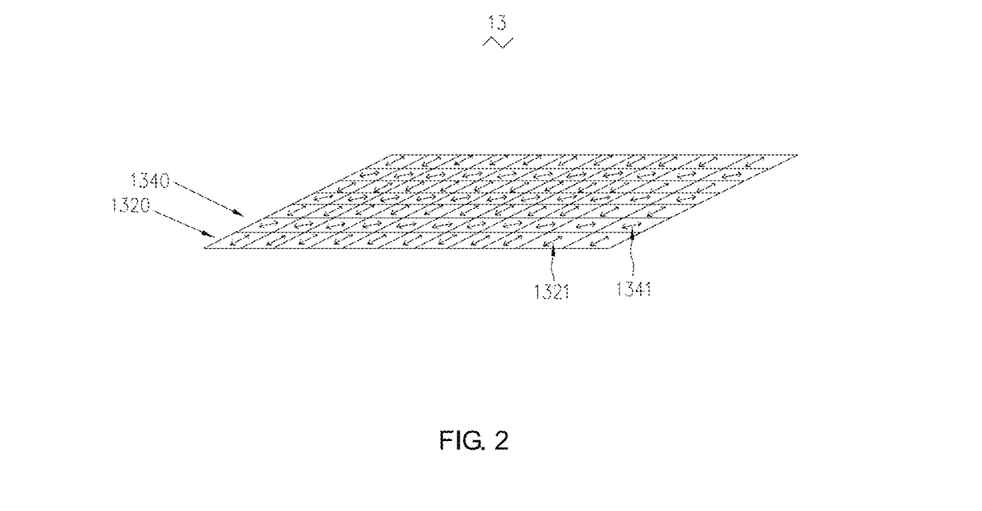
FIG. 2 is a schematic view showing a first polarizer of the liquid crystal panel of FIG. 1.

As shown in FIG. 2, the first polarizer 13 comprises a plurality of first absorption axis series 1320 and second absorption axis series 1340 that are arranged alternately. Each of the first absorption axis series 1320 comprises a plurality of first absorption axes 1321 that is arranged side by side to form a row. Each of the second absorption axis series 1340 comprises second absorption axes 1341 that are arranged to form a row.

Figure 3:
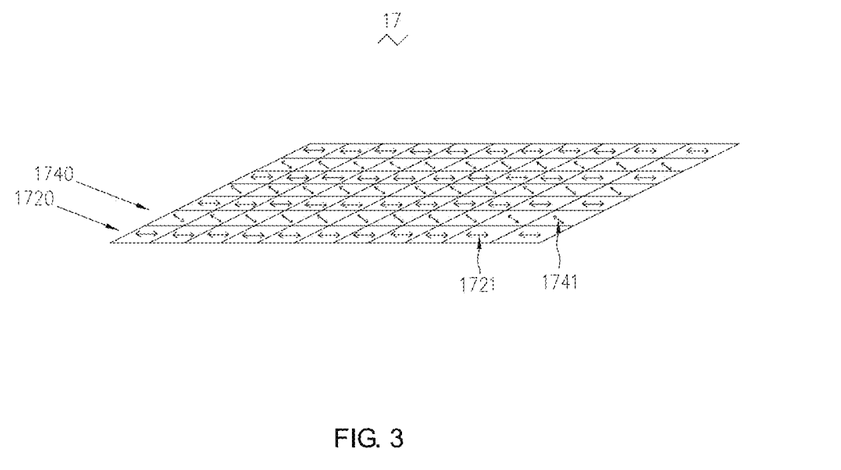
FIG. 3 is a schematic view showing a second polarizer of the liquid crystal panel of FIG. 1.

As shown in FIG. 3, the second polarizer 17 comprises a plurality of third absorption axis series 1720 and fourth absorption axis series 1740 that are arranged alternately. Each of the third absorption axis series 1720 comprises a plurality of third absorption axes 1721 that is arranged side by side to form a row. Each of the fourth absorption axis series 1740 comprises fourth absorption axes 1741 that are arranged side by side to form a row.

The first absorption axes 1321 of the first polarizer 13 and the third absorption axes 1721 of the second polarizer 17 have axial directions that are orthogonal to each other and form a first orthogonal system. The second absorption axes 1341 of the first polarizer 17 and the fourth absorption axes 1741 of the second polarizer 17 have axial directions that are orthogonal to each other and form a second orthogonal system. An included angle between the first orthogonal system and the second orthogonal system is 45 degrees.

The first polarizer 13 and the second polarizer 17 can be organic polarizers, such as polyvinylalcohol film optic polarization plate and dichroic organic dye polarization plates. The first polarizer 13 and the second polarizer 17 may also be metal wire grating polarizers.

Figure 4:
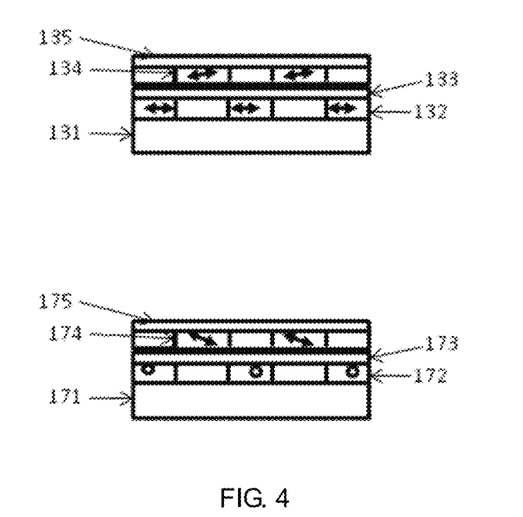
FIG. 4 is a cross-sectional view showing the first polarizer and the second polarizer of the liquid crystal panel of FIG. 1.

As shown in FIG. 4, taking the first polarizer 13 as an example, in the case that the first polarizer 13 is an organic polarizer, the first polarizer 13 comprises, sequentially stacked, a first substrate 131, a first sub polarization layer 132, a first middle planarization layer 133, a second sub polarization layer 134, and a first surface planarization layer 135. The first sub polarization layer 132 comprises the first absorption axis series 1320 and the second sub polarization layer 134 comprises the second absorption axis series 1340. The second absorption axis series 1340 and the first absorption axis series 1320 are sequentially and alternately arranged on a plane on which the first polarizer 13 is located.

The manufacturing process comprises the following steps:

coating a sub polarization layer on a first substrate 131, where the first substrate 131 is a glass substrate;

etching the sub polarization layer to form the first sub polarization layer 132, where the first sub polarization layer 132 comprises a plurality of spaced first absorption axis series 1320 and in the etching process, coating of photoresist may be conducted and exposure and development are performed so as to form a plurality of spaced first absorption axis series 1320 in the first sub polarization layer 132, this being achievable with known techniques so that repeated description will be omitted;

coating a first middle planarization layer 133 on a surface of the first sub polarization layer 132;

coating a sub polarization layer on a surface of the first middle planarization layer 133 and etching the sub polarization layer that is coated on the surface of the first middle planarization layer 133 so as to form a second sub polarization layer 134, where the second sub polarization layer 134 comprises a plurality of second absorption axis series 1340 and each of the second absorption axis series 1340 of the second sub polarization layer 134 has a projection cast on the first substrate 131 and located between projections of two adjacent ones of the first absorption axis series 1320 of the first sub polarization layer 132 cast on the first substrate 131 so that the second absorption axis series 1340 and the first absorption axis series 1320 are arranged alternately on a plane on which the first polarizer 13 is located; and coating a first surface planarization layer 135 on a surface of the second sub polarization layer 134.

Similarly, in the case that the second polarizer 17 is an organic polarizer, the manufacturing process thereof is identical to that of the first polarizer 13.

The second polarizer 17 comprises, sequentially stacked, a second substrate 171, a third sub polarization layer 172, a second middle planarization layer 173, a fourth sub polarization layer 174, and a second surface planarization layer 175. The third sub polarization layer 172 comprises the third absorption axis series 1720 and the fourth sub polarization layer 174 comprises the fourth absorption axis series 1740. The fourth absorption axis series 1740 and the third absorption axis series 1720 are arranged alternately on the plane on which the first polarizer 13 is located.

In another embodiment of the present invention, the first polarizer 13 and the second polarizer 17 can be metal wire grating polarizers.

The liquid crystal panel 10 of the present invention is applicable to an in-plane switching (IPS) mode, a vertical alignment (VA) mode, a fringe field switching (FFS) mode, and a twisted nematic (TN) mode. The first orthogonal system and the second orthogonal system are arranged to respectively correspond to different pixel rows of the liquid crystal panel 10.

Figure 5:
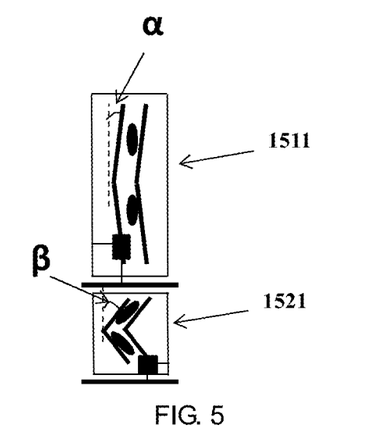
FIG. 5 is a schematic view illustrating the construction of a pixel for an IPS mode of the liquid crystal panel according to the preferred embodiment of the present invention.

For example, in the case that the liquid crystal panel 10 adopts the IPS mode, as shown in FIG. 5, the liquid crystal layer 15 of the liquid crystal panel 10 comprises a plurality of pixels 150 and the pixels 150 comprise primary pixels 1511 and secondary pixels 1521.

Further, the pixels 150 are divided into primary pixel rows (not shown) and secondary pixel rows (not shown) that alternate each other. The primary pixel rows comprise a plurality of primary pixels 1511 and the secondary pixel rows comprise a plurality of secondary pixels 1521. Initial orientation angles of liquid crystal of the primary pixels 1511 and liquid crystal of the secondary pixels 1521 define therebetween an included angle of 45 degrees. The primary pixels 1511 of the primary pixel rows are arranged to correspond to the first orthogonal system and the secondary pixels 1521 of the secondary pixel rows are arranged to correspond to the second orthogonal system.

Figure 6:
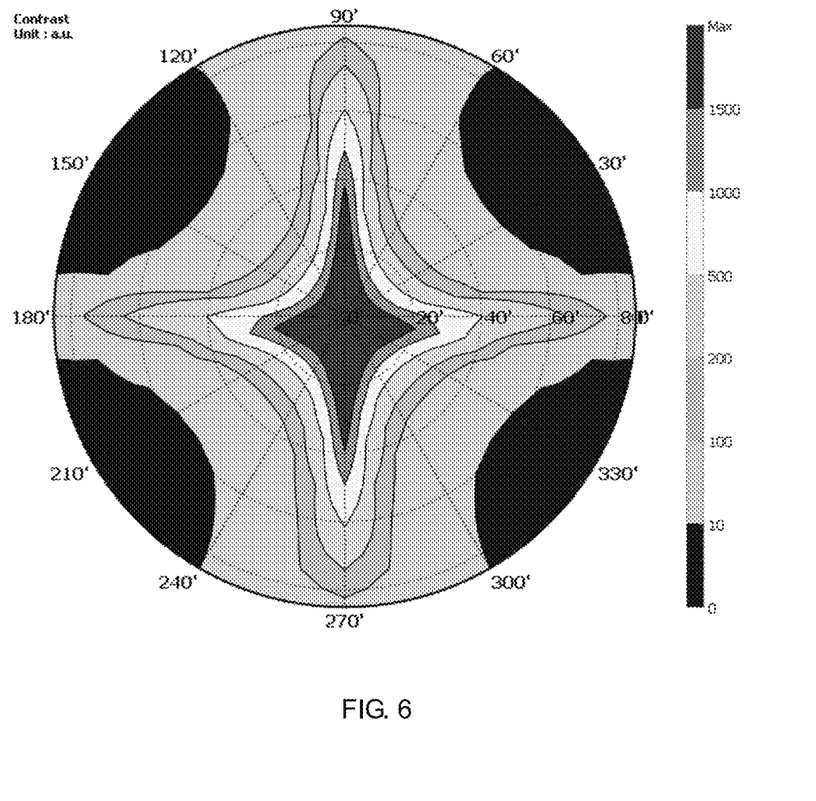
FIG. 6 is a diagram of a view angle of a primary pixel for an IPS mode of the liquid crystal panel according to the preferred embodiment of the present invention.
Figure 7:
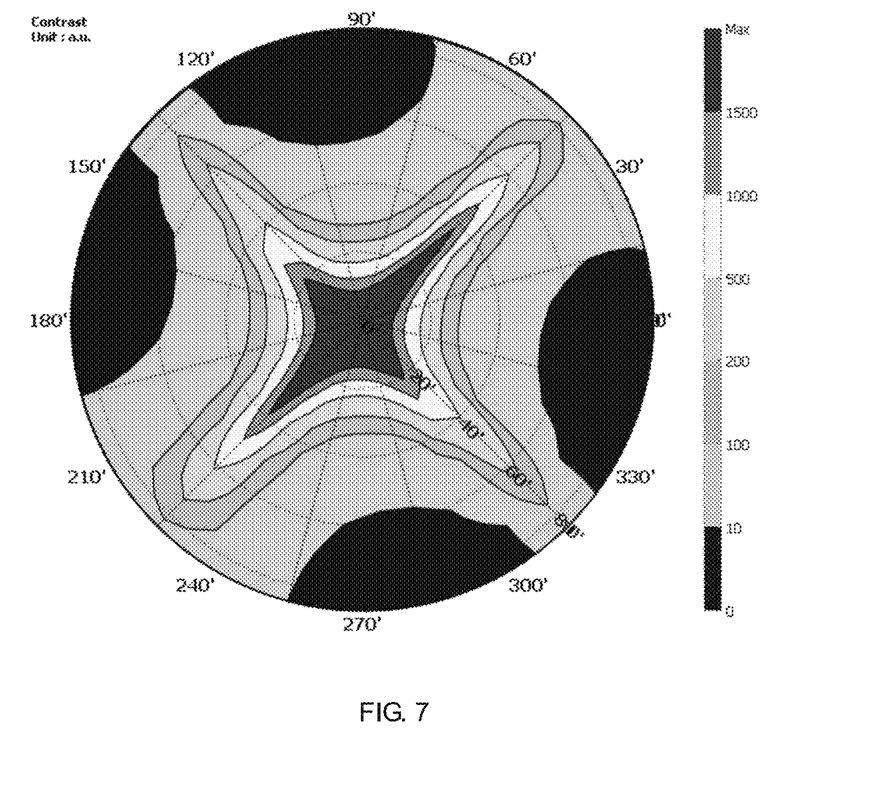
FIG. 7 is a diagram of a view angle of a secondary pixel for an IPS mode of the liquid crystal panel according to the preferred embodiment of the present invention.

To use, the primary pixels 1511 have an electrode angle α that is 7 degrees and the secondary pixels 1521 has an electrode angle β that is 52 degrees or 38 degrees. This makes the initial orientation angle of the liquid crystal of the primary pixels 1511 and that of the liquid crystal of the secondary pixels 1521 define therebetween an included angle between of 45 degrees. The primary pixels 1511 and the secondary pixels 1521 are controlled through different gate lines. When the primary pixels 1511 are in operation, as shown FIG. 6, the best view angle is at directions associated with orientation angles of 0 degree and 90 degrees. When the secondary pixels 1521 are in operation, as shown in FIG. 7, the best view angle is at directions associated with orientation angles of 45 degrees and 135 degrees. Through switching of operations between the primary pixels 1511 and the secondary pixels 1521, switching to the best view angle can be achieved.

Figure 8:
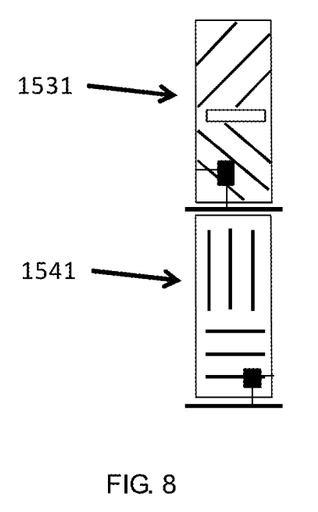
FIG. 8 is a schematic view illustrating the construction of a pixel for a VA mode of the liquid crystal panel according to the preferred embodiment of the present invention.

Further, as shown in FIG. 8, in the case that the liquid crystal panel 10 adopts the VA mode, the liquid crystal layer 15 of the liquid crystal panel 10 comprises odd pixel rows and even pixel rows that are arranged alternately. The odd pixel rows each comprise a plurality of odd-row pixels 1531 and the even pixel rows each comprise a plurality of even-row pixels 1541. The initial orientation angle of liquid crystal of the odd-row pixels 1531 and that of liquid crystal of the even-row pixels 1541 define therebetween an included angle of 45 degrees.

The odd-row pixels 1531 of the odd pixel rows are arranged to correspond to the first orthogonal system and the even-row pixels 1541 of the even pixel rows are arranged to correspond to the second orthogonal system.

The best view angles are at the orientation angles of 0 degree and 90 degrees when the odd-row pixels 1531 of the odd pixel rows are in operation. The best view angles are at the orientation angles of 45 degrees and 135 degrees when the even-row pixels 1541 of the even pixel rows are in operation. Through switching of operations between the odd-row pixels 1531 and the even-row pixels 1541, switching to the best view angle can be achieved.

Further, tilt direction of the liquid crystal molecules contained in the odd-row pixels 1531 and the even-row pixels 1541 matches the corresponding first orthogonal system or second orthogonal system. For example, the tilt direction of the liquid crystal molecules of the odd-row pixels 1531 defines an included angle of 45 degrees with respect to the first absorption axes 1321 or the second absorption axes 1341 of the first orthogonal system.

The tilt direction of the liquid crystal molecules of the even-row pixels 1541 defines an included angle of 45 degrees with respect to the third absorption axes 1721 or the fourth absorption axes 1741 of the second orthogonal system.

The present invention provides a liquid crystal panel 10 helps improve CR (Contrast Ratio) at a large oblique view angle during the use thereof. When the liquid crystal panel 10 adopts an IPS mode, the primary pixels 1511 and the secondary pixels 1521 are put into operations together and the first orthogonal system and the second orthogonal system are also in operation together. When the liquid crystal panel 10 adopts a VA mode, the odd-row pixels 1531 and the even-row pixels 1541 are put into operation together and the first orthogonal system and the second orthogonal system are also in operation together. There is only one half light leakage occurring at orientation angles of 45 degrees and 135 degrees so as to, in an equivalent way, increase CR at large view angle, but still preserve, to some extents, the high CR for a large view angle at orientation angles of 0 degree and 90 degrees.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. A liquid crystal panel, comprising, sequentially stacked, a glass cover plate, a first polarizer, a liquid crystal layer, a second polarizer, and a glass bottom plate, the liquid crystal layer comprising a plurality of pixels, each of the pixels comprising a plurality of liquid crystal molecules, the first polarizer comprising first absorption axes and second absorption axes, the second polarizer comprising third absorption axes and fourth absorption axes, the first absorption axes of the first polarizer and the third absorption axes of the second polarizer having axial directions that are orthogonal to each other and form a first orthogonal system, the second absorption axes of the first polarizer and the fourth absorption axes of the second polarizer having axial directions that are orthogonal to each other and form a second orthogonal system, the first orthogonal system and the second orthogonal system defining therebetween an included angle of 45 degrees;

wherein the first polarizer comprises a plurality of first absorption axis series and second absorption axis series that are arranged alternately, each of the first absorption axis series comprising a plurality of the first absorption axes that is arranged to form a row, each of the second absorption axis series comprising a plurality of the second absorption axes that is arranged to form a row; and wherein the first polarizer comprises, sequentially stacked, a first substrate, a first sub polarization layer, a first middle planarization layer, a second sub polarization layer, and a first surface planarization layer, the first absorption axis series being formed on the first sub polarization layer, the second absorption axis series being formed the second sub polarization layer, the second absorption axis series and the first absorption axis series being sequentially and alternately arranged on a plane on which the first polarizer is located.

2. The liquid crystal panel as claimed in claim 1, wherein the second polarizer comprises a plurality of third absorption axis series and fourth absorption axis series that are arranged alternately, each of the third absorption axis series comprising a plurality of the third absorption axes that is arranged to form a row, each of the fourth absorption axis series comprising a plurality of the fourth absorption axes that is arranged to form a row.

3. The liquid crystal panel as claimed in claim 2, wherein the second polarizer comprises, sequentially stacked, a second substrate, a third sub polarization layer, a second middle planarization layer, a fourth sub polarization layer, and a second surface planarization layer, the third absorption axis series being formed on the third sub polarization layer, the fourth absorption axis series being formed on the fourth sub polarization layer, the fourth absorption axis series and the third absorption axis series being sequentially and alternately arranged on a plane on which the second polarizer is located.

4. The liquid crystal panel as claimed in claim 1, wherein the first polarizer and the second polarizer are organic polarizers.

5. The liquid crystal panel as claimed in claim 4, wherein the first polarizer and the second polarizer are polyvinylalcohol film optic polarization plates or dichroic organic dye polarization plates.

6. The liquid crystal panel as claimed in claim 1, wherein the first polarizer and the second polarizer are metal wire grating polarizers.

7. The liquid crystal panel as claimed in claim 1, wherein the first orthogonal system and the second orthogonal system are arranged to correspond to different pixel rows of the liquid crystal panel.

8. The A liquid crystal displaying device, comprising a liquid crystal panel, the liquid crystal panel comprising, sequentially stacked, a glass cover plate, a first polarizer, a liquid crystal layer, a second polarizer, and a glass bottom plate, the liquid crystal layer comprising a plurality of pixels, each of the pixels comprising a plurality of liquid crystal molecules, the first polarizer comprising first absorption axes and second absorption axes, the second polarizer comprising third absorption axes and fourth absorption axes, the first absorption axes of the first polarizer and the third absorption axes of the second polarizer having axial directions that are orthogonal to each other and form a first orthogonal system, the second absorption axes of the first polarizer and the fourth absorption axes of the second polarizer having axial directions that are orthogonal to each other and form a second orthogonal system, the first orthogonal system and the second orthogonal system defining therebetween an included angle of 45 degrees;

wherein the first polarizer comprises a plurality of first absorption axis series and second absorption axis series that are arranged alternately, each of the first absorption axis series comprising a plurality of the first absorption axes that is arranged to form a row, each of the second absorption axis series comprising a plurality of the second absorption axes that is arranged to form a row; and wherein the first polarizer comprises, sequentially stacked, a first substrate, a first sub polarization layer, a first middle planarization layer, a second sub polarization layer, and a first surface planarization layer, the first absorption axis series being formed on the first sub polarization layer, the second absorption axis series being formed the second sub polarization layer, the second absorption axis series and the first absorption axis series being sequentially and alternately arranged on a plane on which the first polarizer is located.

9. The liquid crystal displaying device as claimed in claim 8, wherein the second polarizer comprises a plurality of third absorption axis series and fourth absorption axis series that are arranged alternately, each of the third absorption axis series comprising a plurality of the third absorption axes that is arranged to form a row, each of the fourth absorption axis series comprising a plurality of the fourth absorption axes that is arranged to form a row.

10. The liquid crystal displaying device as claimed in claim 9, wherein the second polarizer comprises, sequentially stacked, a second substrate, a third sub polarization layer, a second middle planarization layer, a fourth sub polarization layer, and a second surface planarization layer, the third absorption axis series being formed on the third sub polarization layer, the fourth absorption axis series being formed on the fourth sub polarization layer, the fourth absorption axis series and the third absorption axis series being sequentially and alternately arranged on a plane on which the second polarizer is located.

11. A liquid crystal panel, comprising, sequentially stacked, a glass cover plate, a first polarizer, a liquid crystal layer, a second polarizer, and a glass bottom plate, the liquid crystal layer comprising a plurality of pixels, each of the pixels comprising a plurality of liquid crystal molecules, the first polarizer comprising first absorption axes and second absorption axes, the second polarizer comprising third absorption axes and fourth absorption axes, the first absorption axes of the first polarizer and the third absorption axes of the second polarizer having axial directions that are orthogonal to each other and form a first orthogonal system, the second absorption axes of the first polarizer and the fourth absorption axes of the second polarizer having axial directions that are orthogonal to each other and form a second orthogonal system, the first orthogonal system and the second orthogonal system defining therebetween an included angle of 45 degrees;

wherein the second polarizer comprises a plurality of third absorption axis series and fourth absorption axis series that are arranged alternately, each of the third absorption axis series comprising a plurality of the third absorption axes that is arranged to form a row, each of the fourth absorption axis series comprising a plurality of the fourth absorption axes that is arranged to form a row; and wherein the second polarizer comprises, sequentially stacked, a second substrate, a third sub polarization layer, a second middle planarization layer, a fourth sub polarization layer, and a second surface planarization layer, the third absorption axis series being formed on the third sub polarization layer, the fourth absorption axis series being formed on the fourth sub polarization layer, the fourth absorption axis series and the third absorption axis series being sequentially and alternately arranged on a plane on which the second polarizer is located.

12. The liquid crystal panel as claimed in claim 11, wherein the first polarizer comprises a plurality of first absorption axis series and second absorption axis series that are arranged alternately, each of the first absorption axis series comprising a plurality of the first absorption axes that is arranged to form a row, each of the second absorption axis series comprising a plurality of the second absorption axes that is arranged to form a row.

13. The liquid crystal panel as claimed in claim 12, wherein the first polarizer comprises, sequentially stacked, a first substrate, a first sub polarization layer, a first middle planarization layer, a second sub polarization layer, and a first surface planarization layer, the first absorption axis series being formed on the first sub polarization layer, the second absorption axis series being formed the second sub polarization layer, the second absorption axis series and the first absorption axis series being sequentially and alternately arranged on a plane on which the first polarizer is located.

14. The liquid crystal panel as claimed in claim 11, wherein the first polarizer and the second polarizer are organic polarizers.

15. The liquid crystal panel as claimed in claim 11, wherein the first polarizer and the second polarizer are metal wire grating polarizers.

16. The liquid crystal panel as claimed in claim 11, wherein the first orthogonal system and the second orthogonal system are arranged to correspond to different pixel rows of the liquid crystal panel.

* * * * *